United States Patent
Ehleiter

(12) 
(10) Patent No.: US 6,240,344 B1
(45) Date of Patent: May 29, 2001

(54) ANALYSIS DEVICE FOR CONTROL DEVICES

(75) Inventor: Joachim Ehleiter, Heidenheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 09/403,351

(22) PCT Filed: Apr. 2, 1998

(86) PCT No.: PCT/EP98/01909

§ 371 Date: Feb. 11, 2000

§ 102(e) Date: Feb. 11, 2000

(87) PCT Pub. No.: WO98/47743

PCT Pub. Date: Oct. 29, 1998

(30) Foreign Application Priority Data

Apr. 24, 1997 (DE) .............................................. 197 17 190

(51) Int. Cl.[7] .............................. G06F 11/00; G06F 15/20
(52) U.S. Cl. ................................ 701/29; 701/30; 701/35; 701/41; 371/16
(58) Field of Search .............................. 701/29; 340/52 F

(56) References Cited

U.S. PATENT DOCUMENTS

| | | | |
|---|---|---|---|
| 4,682,294 | * | 7/1987 | Duc et al. ............................ 364/492 |
| 4,804,937 | * | 2/1989 | Barbiaux et al. .................... 340/52 F |
| 4,843,557 | * | 6/1989 | Ina et al. ........................... 364/431.77 |
| 4,942,571 | * | 7/1990 | Moller et al. ........................ 370/85.1 |
| 5,369,584 | * | 11/1994 | Kajiwara .......................... 364/424.05 |
| 5,832,397 | * | 11/1998 | Yoshida et al. ......................... 701/29 |
| 6,009,363 | * | 12/1999 | Beckert et al. ........................ 701/33 |

FOREIGN PATENT DOCUMENTS

| | | | |
|---|---|---|---|
| 36 24 456 | 1/1988 | (DE) | .............................. B60R/16/02 |
| 38 10 241 | 10/1988 | (DE) | .............................. G01M/17/00 |
| 42 33 268 | 4/1994 | (DE) | .............................. B60G/17/00 |

* cited by examiner

Primary Examiner—William A. Cuchlinski, Jr.
Assistant Examiner—Tuan C To
(74) Attorney, Agent, or Firm—Ohlandt, Greeley, Ruggiero & Perle, LLP

(57) ABSTRACT

A system is provided for analyzing peripheral components and/or control devices connected to a control apparatus, especially a transmission control apparatus. The control apparatus has entry and exit points for at least one entry and/or exit function as well as a data set having the allocation of entry and/or exit functions to the corresponding entry and/or exit points. The system has an output device for reading the allocation of the entry and/or exit functions to the entry and/or exit points from the data set and for outputting the functions allocated to the various entry and/or exit points on the output device.

8 Claims, 1 Drawing Sheet

ANALYSIS DEVICE FOR CONTROL DEVICES

BACKGROUND OF THE INVENTION

1. Field of the Invention

Figure 1:
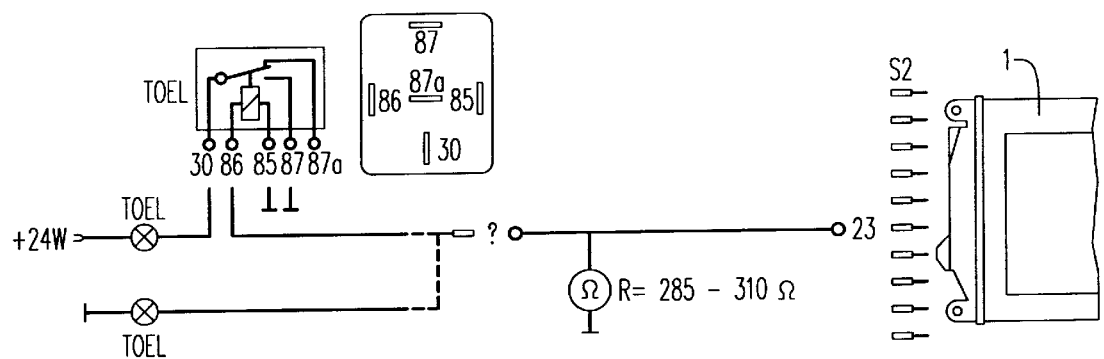

The invention concerns a system for the analysis of peripheral modules and/or control units, which communicate with a control device, particularly the drive [transmission] control mechanism, incorporated in the motor vehicle. The control device has inputs and/or outputs. In addition to the device, the invention also makes available a process for the analysis of control equipment and/or peripheral modules, which are connected to a control device.

2. Description of Related Art

Control devices and control equipment find multiple uses currently in motor vehicles; for example, the engine [speed] control device or the transmission control mechanism can be named. In order to be able to use one and the same transmission control mechanism in vehicles with different types of transmissions, a portion of the inputs and/or the outputs or even all inputs and/or outputs of the control equipment can be provided in a freely configurable design. For example, a data record is filed in a memory area in the control device, from which can be derived the assignments of the individual input and/or output functions to the inputs and/or outputs of the control unit. This means that the control device can recognize, on the basis of this data record, how to interpret the incoming input signals and on which PINs the output signals are to be generated.

In case of defects of peripheral modules or, however, of the control device itself, it was necessary, according to the prior art, to measure individually all inputs and/or outputs and to configure the rebuilt device corresponding to the basic input and/or output functions. This involved a considerable expenditure for preparing drawings and for administration.

Another problem was the following:

Peripheral modules or also control devices, such as, for example, the engine control device, are often allocated according to the customer's wish with arbitrary input and/or output functions. The number of possible input and/or output functions can exceed the number of physically present inputs and/or outputs of the control device. For example, in diagnosing [problems] in such freely configured systems, it is particularly difficult for a service technician working on them to find which functions are basically used.

From DE 4,240,447, a process has been made known for the electronic coding of a vehicle-specific combination of optional, secondary electronic control devices, which can be combined with a primary control device by means of a common signal line.

DE 3,934,974 showed a device for the function control of several control devices in a motor vehicle by means of a control display, whereby means for producing a control signal as a function message are provided in each control device, and whereby, on the basis of this control signal, information can be output for the control of the control display.

SUMMARY OF THE INVENTION

The object of the invention is thus to make available an analytical system for the analysis of peripheral modules or control units, which are connected to a control device, for example a transmission control mechanism, with which the above-depicted disadvantages of the prior art can be overcome. In particular, a process and a device will be made available with the invention, with which the diagnosis of control units or peripheral modules connected to a control device can be carried out rapidly and in a cost-favorable manner. Also, a diagnosis of simple modules, such as sensors and switches, will be possible.

The object is resolved according to the invention by the system according to claim 1 and the process according to claim 8.

The analytical device according to the invention makes available a read-out unit, in order to read out the allocation of the assignment of input and/or output functions to inputs and/or outputs. The allocations determined in this way are output on the output device of the analytical device, whereby the output device is preferably a central processing unit with conventional display screen, or even an output by means of a printer.

In a further development of the invention, it is provided that the control device has at least one input and/or output that can be freely allocated. Advantageously, the system has means for preparing wiring diagrams for the inputs and/or outputs of the control units and/or peripheral modules that can be connected to the control device.

All components that communicate electronically with the control device are to be understood as peripheral modules in this application, for example, relays, lamps, switches, sensors, solenoid valves. As control units, with which the control device communicates, for example, reference can be made to the engine [speed] control device, the control device for the anti-lock system or the automatic slip control.

The read-out of the data record filed in the control device can advantageously be conducted by a serial interface, for example, a conventional RS232 interface.

Ideally, the means for preparing wiring diagrams comprise at least one memory area, in which at least the basic configurations of all possible input and output functions are filed.

DESCRIPTION OF THE INVENTION

It is particularly advantageous if the wiring diagram required for a specific input and/or output allocation is prepared automatically by means of a computational algorithm.

In addition to the device, the invention also makes available a process for the analysis of control equipment and/or peripheral modules, which are connected to a control device, whereby the control device has at least one input/output function and a data record, which contains the assignment of the input and/or output functions to the respective inputs and/or outputs. The process according to the invention is characterized by the fact that the read-out equipment transmits an inquiry with respect to a specific input and/or output function to the control device; based on this inquiry, the assignment is read out from the data record or configuration file that is filed in the control unit, and the PIN allocation is output on the output device, whereby the function assigned to the PIN is represented. It is provided in a further improvement of the process that wiring diagrams for specific components that can be connected are prepared from this information by means of an algorithm. The above-named device and the process are particularly suitable when used for the analysis of control devices in vehicles, particularly of transmission control mechanisms. Defects of the control equipment and/or peripheral modules, which are connected to the control device, can be easily found, for example, by means of a portable microcomputer. This makes possible a rapid diagnosis and location of the defect, which is independent of site.

The invention will now be described by examples.

FIG. 1 shows the combination of the basic configuration or of the part of the wiring diagram which is the same for all possible input and/or output functions, with the determined PIN allocation.

The control device will make available, in a first example of embodiment, freely allocatable inputs and/or outputs as well as a rigid assignment of input and/or output functions with a coding of these input and/or output functions.

This is shown, for example, in Table 1.

TABLE 1

| Input and/or output function | Coding |
|---|---|
| A | 0001 |
| B | 0010 |
| C | 0011 |

The control device comprises a specific number of outputs for output functions and a specific number of inputs for input functions. In the present example, there are a total of three inputs or outputs, which are correspondingly allocated.

A data record or configuration file is filed also in the control device, for example in a memory module, and this data file contains the assignment of the individual input and/or output functions to the input and/or output pins of the control device. On the basis of this data record, the control device recognizes, for example, how the incoming input signals are to be interpreted. The assignment of the individual input and/or output functions is shown in Table 2:

TABLE 2

| Number of input and/or output function | Pin number of the control device | Coding of the input and/or output function |
|---|---|---|
| 1 | 17 | 0010 |
| 2 | 52 | 0011 |
| 3 | 23 | 0001 |

Now if an individual output, an individual input, or even several inputs and/or outputs are diagnosed, then this is done with a read-out device, for example, as follows:

All theoretically possible allocations of the inputs and/or outputs, for example, are filed in a memory area in the read-out device. The read-out device now sends inquiries to the control device, for example the code 0001 for the input and/or output function A. The data record filed, for example, in a memory module in the control device is now questioned as to which input and/or output pin is allocated the input and/or output function, which bears the code 0001.

In the present example, according to Table 2, this would be pin number 23. This result is transmitted to the read-out unit and is output from this unit to an output unit, for example, a monitor screen of a microcomputer.

It is possible to read out only individual PIN allocations or even all PIN allocations. In a further improvement of the invention, it may be provided that the system makes available means for preparing wiring diagrams, for example a memory area and a computer device, which can be integrated, for example, in the read-out device.

The basic configuration, i.e., the part of the wiring diagram that is always the same for all possible input and/or output functions can be stored in the memory area in this form of embodiment.

From the basic configuration of the input and/or output functions and the assignment of the input and/or output functions read out from the control device, the computer equipment of the read-out device combines the total configuration of the input and/or output functions and brings them to the output unit for representation.

The resulting display of such a determination is shown in FIG. 1. The wiring diagram is shown in FIG. 1, whereby PIN 23 of control device 1 is allocated the output function A and the code 0001, as described in the previous example, which is displayed with the arrangement according to the invention.

Now if a peripheral module or a control unit is to be diagnosed, then only one command for diagnosis need be given by the user for the specific output function. The diagnostic or analytical system then allocates the diagnostic command automatically in a correct manner.

The input function or signal form that is expected at the corresponding input is then tested.

The execution will be described, for example, as follows:

For example, the expected signal of the engine control device lies on PIN 23 and is a pulse-width-modulated signal with a specific frequency, which represents the gas-pedal position.

If it should happen that when testing the signal at input pin 23 of the transmission control mechanism for the engine control that the expected signal does not coincide with the actually applied signal, then the error message is output on the output device that the connection to the engine control device is not operating correctly.

The analysis or diagnosis of other peripheral modules or control units connected to the control device can proceed analogously to that described above.

In the following example, the advantages of the analytical device according to the invention are clarified once more. A control device, for example, will make available three configurable inputs (PIN 1, PIN 2, PIN 3) and in addition, input functions A and B. It is filed in the data record of the control device that function A will be read in at input 2 (PIN 2) and function B will be read in at input 1 (PIN 1). Input 3 (PIN 3) will remain without function There results from the number of PINs and the two functions A and B assigned to the inputs six possible configurations for this control device. The possible configurations are listed in the following table.

TABLE 3

| | Pin 1 | Pin 2 | Pin 3 |
|---|---|---|---|
| Configuration 1 A1/B2 | A | B | |
| Configuration 2 A1/B3 | A | | B |
| Configuration 3 A2/B1 | B | A | |
| Configuration 4 A2/B3 | | A | B |
| Configuration 5 A3/B1 | B | | A |
| Configuration 6 A3/B2 | | B | A |

As can be seen from the table, six configurations for this control device are thus also theoretically possible. By means of the device of the invention or of the process of the invention, it is now possible to immediately display the fact that the control device makes available configuration 3 with the allocation A2/B1.

Therefore, as described above, a rapid diagnosis or function testing can be conducted.

What is claimed is:

1. A system for the analysis of peripheral modules and/or control units, that are connected to a control device, wherein the control device has one or more inputs and/or outputs for one or more input and/or output functions and a data record, that contains an assignment of the input and/or output functions to the respective inputs and/or outputs of the control device, the system having an output device, and wherein said peripheral modules and/or said control units are connectable to the inputs and/or outputs of the control unit; the system comprising:

an output unit for reading out from the data record the assignment of the input and/or output functions to the inputs and/or outputs of the control device, and providing the functions assigned to the individual inputs and/or outputs of the control device to the output device; and means for preparing wiring diagrams for said peripheral modules and/or control units, and wherein said means for preparing wiring diagrams includes a computer device for preparing said wiring diagrams.

2. The system according to claim 1, wherein the output unit is an external computer.

3. The system according to claim 1, wherein the control device has at least one freely configurable input and/or output.

4. The system according to claim 1, wherein the output unit has a serial interface.

5. The system according to claim 4, wherein the means for preparing wiring diagrams includes at least one memory area, in which at least one basic configuration is filed.

6. The system according to claim 3, wherein the control device and the control units and peripheral components are contained in a motor vehicle.

7. The system according to claim 6, wherein the control device controls a drive transmission of the motor vehicle.

8. A process for the analysis of one or more control units and/or peripheral modules that are connected to one or more inputs or outputs of a control device contained in a motor vehicle, the control device having a data record that includes an assignment of the inputs and/or outputs to specific ones of a plurality of input and/or output functions, said process comprising:

(a) transmitting an inquiry to the control device concerning a first one of the plurality of input or output functions;

(b) reading from the data record, on the basis of the inquiry, the assignment of the first input or output function to a first input or output of the control device;

(c) providing the assignment of step (b) to an output device for representation of the first input or output function assigned to the first input or output of the control device; and (d) assigning, automatically in response to entry of a diagnostic command in the output device, the diagnostic command to the first input or output of the control device.

* * * * *